United States Patent
Salmon et al.

(10) Patent No.: US 8,645,012 B2
(45) Date of Patent: Feb. 4, 2014

(54) SYSTEM AND METHOD FOR AUTOMATICALLY NAVIGATING A DEPTH CONTOUR

(75) Inventors: Paul D. Salmon, Mankato, MN (US); Michael Wesley Wood, Cushing, MN (US); Jeffrey Earl Smith, Farmington, MN (US); David Charles Evers, Acworth, GA (US)

(73) Assignee: Johnson Outdoors Inc., Racine, WI (US)

( * ) Notice: Subject to any disclaimer, the term of this patent is extended or adjusted under 35 U.S.C. 154(b) by 70 days.

(21) Appl. No.: 13/479,381

(22) Filed: May 24, 2012

(65) Prior Publication Data

US 2012/0232719 A1    Sep. 13, 2012

Related U.S. Application Data

(63) Continuation-in-part of application No. 13/110,587, filed on May 18, 2011, now Pat. No. 8,543,269.

(60) Provisional application No. 61/375,383, filed on Aug. 20, 2010, provisional application No. 61/489,567, filed on May 24, 2011.

(51) Int. Cl.
 *B60L 15/00* (2006.01)
(52) U.S. Cl.
 USPC ............................................. 701/21
(58) Field of Classification Search
 USPC ........ 701/2, 21, 400, 410, 412, 418, 421, 431
 See application file for complete search history.

(56) References Cited

U.S. PATENT DOCUMENTS

| | | | |
|---|---|---|---|
| 4,428,052 | A | 1/1984 | Robinson et al. |
| 4,597,069 | A | 6/1986 | Milano et al. |
| 5,172,324 | A | 12/1992 | Knight |
| 5,268,844 | A | 12/1993 | Carver et al. |
| 5,309,408 | A | 5/1994 | Bick et al. |
| 5,362,263 | A | 11/1994 | Petty |
| 5,386,368 | A | 1/1995 | Knight |
| 5,400,300 | A | 3/1995 | Bick et al. |
| 5,546,695 | A | 8/1996 | Langer |
| 5,884,213 | A | 3/1999 | Carlson |
| 6,208,758 | B1 | 3/2001 | Ono et al. |
| 6,256,585 | B1 | 7/2001 | Shannon |
| 6,750,815 | B2 | 6/2004 | Michaelson et al. |
| 6,873,570 | B2 | 3/2005 | Zhu et al. |
| 6,934,608 | B2 | 8/2005 | Qureshi |
| 6,934,657 | B1 | 8/2005 | Carlson et al. |
| 7,124,022 | B2 | 10/2006 | Carmichael et al. |

(Continued)

*Primary Examiner* — Kim T Nguyen

(74) *Attorney, Agent, or Firm* — Reinhart Boerner Van Deuren P.C.

(57) ABSTRACT

A system for controlling a marine vessel that includes a sonar depth finder configured to display a chart for a body of water. The chart has depth information for the body of water, and is programmed to allow a user to select from a plurality of depths indicated on the sonar depth finder display. The sonar depth finder further is configured to generate a route for the marine vessel. The route includes a path through the body of water where each point along the path is at the desired depth. The system includes a vessel control device in communication with the sonar depth finder. The vessel control device is configured to receive transmissions from the sonar depth finder. The transmissions include the route generated by the sonar depth finder. The vessel control device is further configured to automatically direct the marine vessel along the route.

19 Claims, 8 Drawing Sheets

(56) References Cited

U.S. PATENT DOCUMENTS

| | | |
|---|---|---|
| 7,209,829 B2 | 4/2007 | Litvack et al. |
| 7,266,532 B2 | 9/2007 | Sutton et al. |
| 7,268,703 B1 | 9/2007 | Kabel et al. |
| 7,313,404 B2 | 12/2007 | Anderson |
| 7,769,504 B2 | 8/2010 | Kaji |
| 7,940,602 B1 | 5/2011 | Korolenko |
| 8,296,001 B1 | 10/2012 | Kabel et al. |
| 2004/0249860 A1 | 12/2004 | Stechschulte et al. |
| 2006/0089794 A1 | 4/2006 | DePasqua |
| 2009/0037040 A1 | 2/2009 | Salmon et al. |
| 2009/0067750 A1 | 3/2009 | Pryszo et al. |
| 2009/0069962 A1 | 3/2009 | Aharon et al. |
| 2009/0147623 A1 | 6/2009 | Betts et al. |
| 2010/0131133 A1 | 5/2010 | Koda et al. |
| 2010/0141518 A1* | 6/2010 | Hersey et al. ............ 342/357.09 |
| 2011/0054784 A1 | 3/2011 | Wood et al. |
| 2011/0054785 A1 | 3/2011 | Wood et al. |
| 2011/0258901 A1 | 10/2011 | Garrett |
| 2012/0015566 A1 | 1/2012 | Salmon |
| 2012/0106300 A1* | 5/2012 | Maguire ....................... 367/153 |
| 2012/0232719 A1 | 9/2012 | Salmon et al. |

* cited by examiner

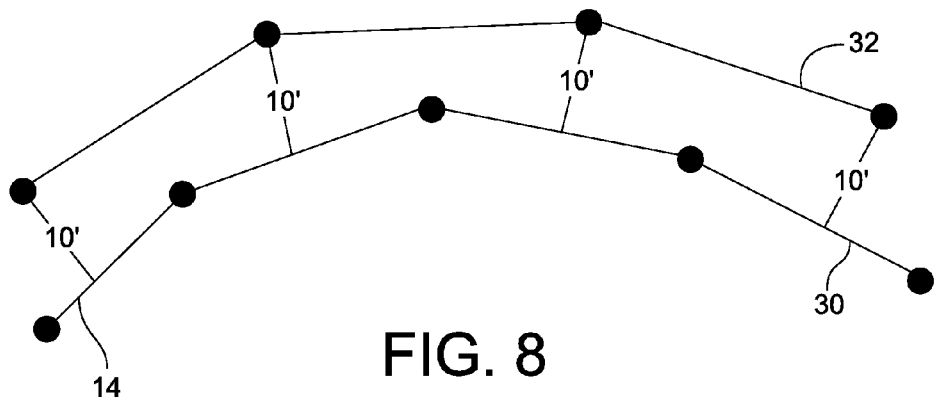
FIG. 8
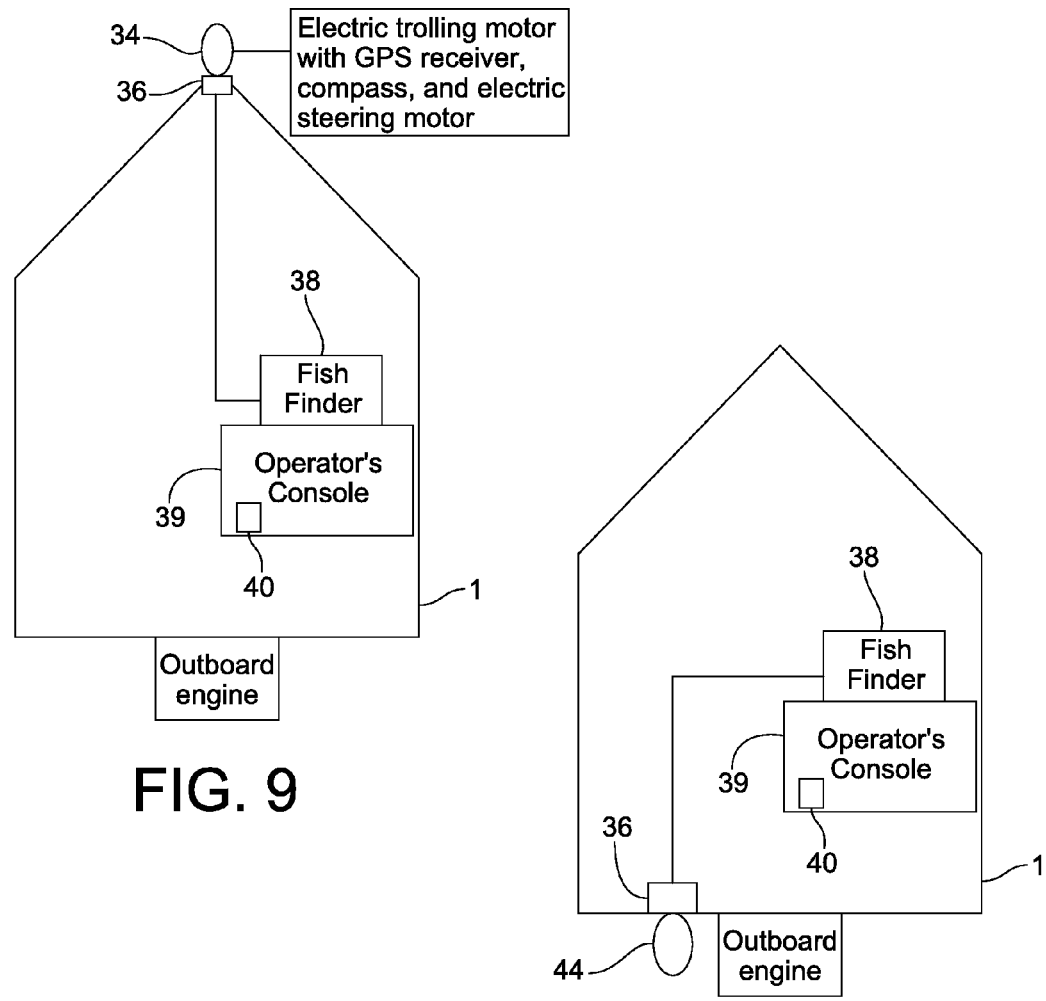
FIG. 9
FIG. 10

SYSTEM AND METHOD FOR AUTOMATICALLY NAVIGATING A DEPTH CONTOUR

CROSS-REFERENCE TO RELATED PATENT APPLICATIONS

This patent application is a Continuation-in-Part of co-pending U.S. patent application Ser. No. 13/110,587, filed May 18, 2011, which claims the benefit of U.S. Provisional Patent Application No. 61/375,383, filed Aug. 20, 2010, the entire teachings and disclosure of which are incorporated herein by reference thereto. This Continuation-in-Part application also claims the benefit of U.S. Provisional Patent Application No. 61/489,567, filed May 24, 2011, the entire teachings and disclosure of which are incorporated herein by reference thereto.

FIELD OF THE INVENTION

This invention generally relates to a system and method for marine navigation.

BACKGROUND OF THE INVENTION

GPS systems play an important role in the marine environment. The basic function is to determine the coordinates of the vessel's present location. These coordinates then allow the user to pinpoint their position on a map or chart of the waterways.

Because waterways change and the methods of creating the cartography is becoming more exact, paper charts are quickly becoming obsolete. Most marine GPS systems now include built-in electronic cartography. This cartography feature is either embedded in the memory of the system or is available on a portable media format (e.g., memory card, CD, etc.). Once the GPS system knows the vessel's present location and has electronic cartography available, it is able to show the present location of the vessel on the system's displayed map. This allows the vessel operator to use the GPS system as a navigational aide.

Some versions of electronic cartography also include water depth information. Here, the water depth is associated with the actual GPS coordinates that make up the chart. Instead of the chart showing the water depth for every available coordinate on the map, the charts use what are known as depth contour or bottom contour lines. These lines are shown periodically in depth increments, such as every 1 foot or every 10 feet or every 100 feet, depending on the actual contour of the bottom and the accuracy of the measurement methods used when creating the cartography. These depth contour lines will follow the depth associated with the line so as the waterway bottom comes up or down these lines will shift accordingly.

Vessel navigation through GPS has evolved from its earlier days in locating the vessel upon a body of water and displaying that location information for a vessel operator to an ability to create user programmed routes to guide the vessel. Conventional GPS allows users to manually create a series of turn points and then connect them together to create a contiguous path for the vessel to follow. Unfortunately, disadvantages exist with conventional GPS. As an example, one disadvantage is that it is cumbersome and, depending on the detail provided by the underlying chart, may not be truly accurate. Additionally, a certain amount of time is generally required to create the turn points necessary to generate a desired route, making it difficult to generate such a route while the vessel is underway.

In conventional GPS systems, the charts, codes, programs and systems typically have limited resources available for processing and converting complex chart and depth contour information. For example, a fishing vessel may be in the vicinity of a desirable depth for fishing, but will typically traverse among various due to an inability to maintain a course in which the depth of the water below the boat is fairly constant.

As such, there exists a need for a system which can automatically create a navigable route along a specific depth contour line depicted on a GPS or other visual display. Embodiments of the invention provide such a system. These and other advantages of the invention, as well as additional inventive features, will be apparent from the description of the invention provided herein.

BRIEF SUMMARY OF THE INVENTION

With respect to embodiments of the present invention, techniques for digital mapping are provided. In particular, an embodiment of the present invention provides methods, devices, codes, and systems for displaying selected regions of a body of water and associated areas. More particularly, the present invention provides systems, methods, codes, and devices for selectively highlighting one or part of one bottom contour (or other region) in the chart of a body of water using a display coupled to a GPS (i.e., global position system or sensor) or other visual Display Device. Of course, other embodiments may be provided as well.

In one aspect, embodiments of the invention provide a system for controlling a marine vessel. The system includes a sonar depth finder configured to display a chart for a body of water. The chart has depth information for the body of water, and is programmed to allow a user to select from a plurality of depths indicated on the sonar depth finder display. The sonar depth finder further is configured to generate a route for the marine vessel. The route includes a path through the body of water where each point along the path is at the desired depth. The system includes a vessel control device in communication with the sonar depth finder. The vessel control device is configured to receive transmissions from the sonar depth finder. These transmissions include the route generated by the sonar depth finder. The vessel control device is further configured to automatically direct the marine vessel along the route.

In another aspect, embodiments of the invention provide a system for controlling a marine vessel. The system includes a sonar depth finder configured to display a chart for a body of water. The chart includes depth information for the body of water. The sonar depth finder is programmed to allow a user to input a desired depth, and the sonar depth finder is configured to generate one or more routes for the marine vessel. The route includes a path through the body of water such that at each point along the path, the water is at the desired depth. The system also includes a vessel control device in communication with the sonar depth finder. The vessel control device is configured to receive transmissions from the sonar depth finder. These transmissions include the route generated by the sonar depth finder. The vessel control device is further configured to automatically direct the marine vessel along the route.

According to embodiments of the present invention, techniques for digital mapping are provided. In particular, embodiments of the present invention provide methods, codes, devices, and systems for displaying selected regions of a body of water and associated areas. More particularly, embodiments of the present invention provide systems, methods, codes, and devices for selectively highlighting one or part of one bottom (or other) contour in the chart of a body of water using a display coupled to a GPS or other visual display device. The selected bottom contour or part thereof to then be converted into a machine-readable code and outputted, as one or more indications associated with the contour lines on the display, in machine-readable code to a vessel control device.

As an example, ProMap Technologies, Inc., d/b/a Lake-Master Lake Maps has developed a Chart Library and Application Programming Interface (API) that allows GPS manufacturers to embed the API into their OS and thus display proprietary LakeMaster Digital Charts. These LakeMaster Digital Charts reside on a secure SD media card in a format initially compatible with certain GPS display devices currently available. Typically GPS displays are configured to display charts and maps in multiple colors, and may display GPS coordinates, including latitude and longitude for selected points on the display. By connecting the GPS device to a vessel control device, the vessel can automatically be directed along selected bottom contour lines without the necessity of creating independent routing information for the vessel control device. Of course, one or ordinary skill in the art would recognize other variations, modifications, and alternatives.

Conventional route generation typically involves creating a route from a first starting point to an end point. Between these points, routes are created. Typically, however, these routes do not traverse along a particular contour, which is often desirable for vessel navigation or fishing techniques. In a specific embodiment, the present method and system provides a way of navigating along a portion of a contour, which has no end points.

In a specific embodiment, the present method and system overcomes one or more of the limitations described above by providing for a rapid, easily applied automatic way of creating a navigable route from complex depth contour line or contour information in a language understandable by and for transmission to various vessel control devices, which are configured to navigate the vessel.

For example, using a Chart Library and API that allows GPS manufacturers to embed the API into their respective operating systems, the manufacturers can display proprietary LakeMaster Digital Charts containing detailed bottom contours of a body of water. The cartographic data is included in a Chart Library which is encoded to allow the user to select and automatically convert a bottom contour or part thereof into a route in machine-readable code that can be used by an autopilot device or direct vessel control device configured for use on commercial and recreational marine vessels, for example.

In a specific embodiment, the present invention provides a method for selecting one or more bottom contour lines of a body of water, such as a lake, river, bay, or stream, from a digital or raster map of the depth or bottom contours displayed on a GPS device or similar type of display device, and converting that map information into machine-readable code to allow a vessel control device, such as a trolling motor controller with autopilot features, to navigate a vessel along the one or more selected depth contours. Such a trolling motor control device is disclosed in U.S. Patent Publication No. 2012/0015566, entitled "System and Method for Controlling a Trolling Motor", whose teachings and disclosure are incorporated in their entirety herein by reference thereto. The aforementioned method includes providing at least one chart out of a plurality of charts of one or more regions of a body of water. In a specific embodiment, the chart comprises a depiction of a plurality of bottom contour lines of constant depth below the surface or of other defined contiguous regions of the one or more regions of the body of water.

Preferably, the chart is configured to allow selection of one or more such contour lines by a user. The method also includes selecting at least one contour or part of a contour to be highlighted simultaneously with the chart on the display and processing information associated with the selected contour with information from the chart to convert one or more lines to machine readable code. The method includes outputting one or more indications associated with the one or more contour lines on the display in machine-readable code to a vessel control device. Optionally, the outputting of the one or more indications is provided simultaneously with the chart to display the one or more indications with the chart together.

In a particular embodiment, the method has various indications. That is, one or more indications are associated with one or more broken contour lines, one or more flashing contour lines, one or more series of symbols, or other visual indications for a display. In a specific embodiment, the one or more indications are associated with one or more contour lines differentiated from the remaining contour lines or wherein the one or more indications are associated with one or more shaded regions differentiated from the remaining regions, or wherein the one or more indications are associated with one or more colored regions differentiated from the remaining regions.

In other embodiments, the method includes a chart, which is displayed and can also be stored in computer memory in computer-readable form. In a specific embodiment, the chart comprises information associated with the plurality of bottom contour lines. In a specific embodiment, the chart is one of a multiple or a plurality of charts provided in a library, which is stored on a media card. In a preferred embodiment, the plurality of charts being in respective raster forms, but can be other combinations. In a specific embodiment, the chart comprises information associated with the plurality of bottom contour lines. In a specific embodiment, the chart is from a plurality of charts provided in a library stored on a media card. In a particular embodiment, the plurality of charts is in respective vector forms. In a more specific embodiment, the chart includes an indication which represents a change in composition of the bottom surface for a body of water. In other embodiments, the chart includes a structure indication representative of, for example, an edge of a weed bed on a bottom surface of the body of water.

In one or more embodiments, the method includes optional techniques for inputting depth information. In a specific embodiment, the method includes selecting particular depth contour comprises, and further includes inputting the depth through a user interface provided on the GPS or other display device. In certain embodiments, the method also includes moving a slide bar on a user interface provided on the GPS or other display device to initiate input of the depth information. In alternate embodiments, the depth information can also be provided via a key pad or toggle switch on the GPS or other display device. In further embodiments, the method includes selecting and highlighting a depth contour on the GPS or other display device, inputting the depth through a user interface to allow one or more voice commands, or inputting the depth through a user interface provided through a key pad or toggle that is separate from the GPS or other display device. Of course, there can be other variations, modifications, and alternatives.

In an alternative specific embodiment, the present method includes selecting a depth contour, which is automatically navigated by a marine vessel. The step of selecting includes inputting a command through a preset user menu interface provided on the GPS or other display device. Inputting the command may be done by one of moving a slide bar on a user interface provided on the GPS or other display device, using a key pad or toggle on the GPS or other display device, inputting the desired depth contour by selecting and highlighting the depth contour on the GPS or other display device, inputting the depth contour via voice commands through a user interface that recognizes such voice commands, and inputting the depth contour through a user interface provided on a key pad or toggle switch, for example, that is separate from the GPS or other display device.

Still further, embodiments of the present invention include a method that calls for selecting a weed bed edge contour, which is navigated by a vessel. The method further includes inputting the command through a preset user menu interface provided on the GPS or other display device. Inputting the command may be done by one of moving a slide bar on a user interface provided on the GPS or other display device, using a key pad or toggle on the GPS or other display device, inputting the desired weed bed edge contour by selecting and highlighting a weed bed edge contour on the GPS or other display device, inputting the weed bed edge contour via voice command through a user interface that recognizes such voice commands, and inputting the weed bed edge contour through a user interface provided through a key pad or toggle switch, for example, that is separate from the GPS or other display device Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 8 is a diagram of a depth contour line along with a laterally-shifted contour line, in accordance with an embodiment of the invention;

FIG. 9 is a diagram of a marine vessel with sonar depth finder/fish finder, bow-mounted trolling motor and trolling motor controller, according to an embodiment of the invention; and FIG. 10 is a diagram of a marine vessel with sonar depth finder/fish finder, transom-mounted trolling motor and trolling motor controller, according to an embodiment of the invention.

Figure 1:
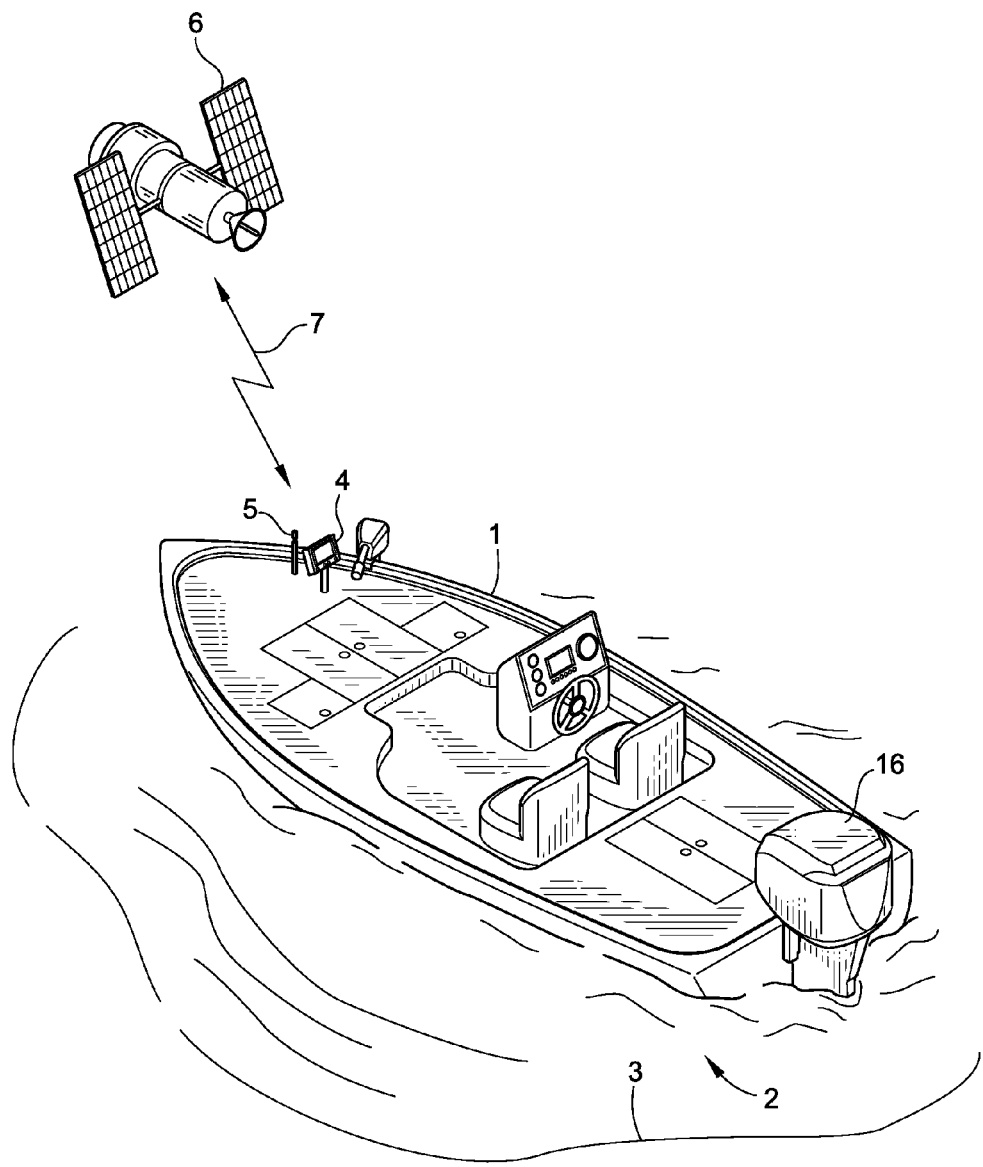
FIG. 1 is a simplified diagram of a system according to an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the present invention provide methods, devices, and systems for selecting from one of a plurality of bottom contour lines for a body of water from a digital or raster map of the body of water that includes depth contours. These depth contour lines are converted into machine-readable code which can be used by a vessel control device, such as a trolling motor control device with autopilot features, to navigate a marine vessel along the selected contour. As an example, ProMap Technologies, Inc., d/b/a LakeMaster®, has developed a Chart Library Application Programming Interface (API) that allows GPS manufacturers to embed the API into their OS and thus make LakeMaster bottom contour maps, proprietary to LakeMaster, accessible from the GPS unit. This GPS unit can be connected to an autopiloting device in such a way that the operator can direct the autopiloting device to use the depth contour information from the Lake-Master maps to guide the marine vessel along a selected route along one of the selected bottom contours. Of course, there can be other variations, modifications, and alternatives.

Modern cartography for waterways typically includes 3D data such as latitude, longitude and depth. Some sonar depth finders, or fish finders, may include algorithms that are used in the cartography software to create contiguous lines to represent certain depths. These depth contour lines are then visibly superimposed upon the displayed maps to give the user an idea of how a certain depth contour traverses the bottom of the waterway. In certain embodiments of the invention, interaction between the cartography and the fish finder software allows for the user to move the cursor above or near a contour line in a way that the contour line can be identified and selected. Once selected, the fish finder can work with the available cartography data to determine a string of latitudinal and longitudinal coordinates, also referred to as track points, that correspond to the contour line displayed on the screen.

Further, as will be explained more fully below, this string of track points can be transferred to a device to control boat position, such as a controller for a trolling motor. Controlled in this manner, the trolling motor can automatically navigate sequentially from track point to track point. As part of selecting the contour line to follow, the user may also be prompted to select which direction the contour line is to be followed. This string of track points could be sent to the device for controlling the trolling motor as segments of the contour line or on an as-needed basis.

The fish finder could also determine the bearing required to navigate from point to point and send this target bearing to the device for controlling the trolling motor which in turn would steer the boat on this target heading.

In particular embodiments, the systems that are described herein are capable of controlling the path of a moving vessel to keep the vessel over a desired water depth. Components of such a system may include, but are not limited to: a means of watercraft propulsion, a GPS receiver with GPS based cartography, a compass to detect the heading of the vessel and/or the propulsion device and a graphical user interface with a keypad or buttons.

To assist the reader in understanding the following description, the following definitions have been provided.

"API" means application programming interface.

"Chart Library" means a collection of subroutines and/or routines that contain code, images and data to provide services to independent programs.

"Contour Line" means one or more lines depicting a contiguous or semi-contiguous area of the bottom of a body of water, where the lines represent a portion of the bottom surface at the same depth below the surface of the water, or one or more lines depicting a transition between two differing areas of bottom composition, bottom hardness, weed growth or current flow. "A contour line (also isoline or isarithm) of a function of two variables is a curve along which the function has a constant value."

"GPS" means Global Positioning Sensor capable of providing a visual representation of geographic location coupled with a map of the surrounding area "GPS/Sonar Combination Unit" (Combo Unit) means one or more configurations of visual displays capable of displaying inputs from GPS and Sonar units on a single integrated display.

"GPS Display Device" means a visual display device in one or more configurations of GPS or Combo unit.

"Map Media Cards" means any form of electronic media mass storage device or media card capable of storing digital information and allowing access to such information by a digital processor.

"Human Interface" means any method by which a human user is able to input specific values (data) into a GPS Display Device to dynamically change the appearance of the visual display in a predetermined manner.

"Shaded" means cross-hatch, dotted, or other fill methods for regions and any and all forms of line or shading depiction.

"Raster" and "Vector" relate to techniques of processing data for display on the GPS, or in any GIS environment. As an example, raster format basically stores a set of images that are "pinned" to a geographic location on the earth. When the GPS location data is input into the GPS software, the image is called up and displayed on the screen. Vector format has discrete points individually coded with geographic location information. That information is output to a program which literally draws the geographic image and then places it on a screen.

"Vessel Control Device or Auto Pilot" means any form of vessel navigation control device capable of receiving and executing machine code instructions from a GPS Processor, Combo Unit Processor or computer central processor.

"Visual Display Device" means a computer screen, liquid crystal display or other means of electronically viewing images.

Figure 2:
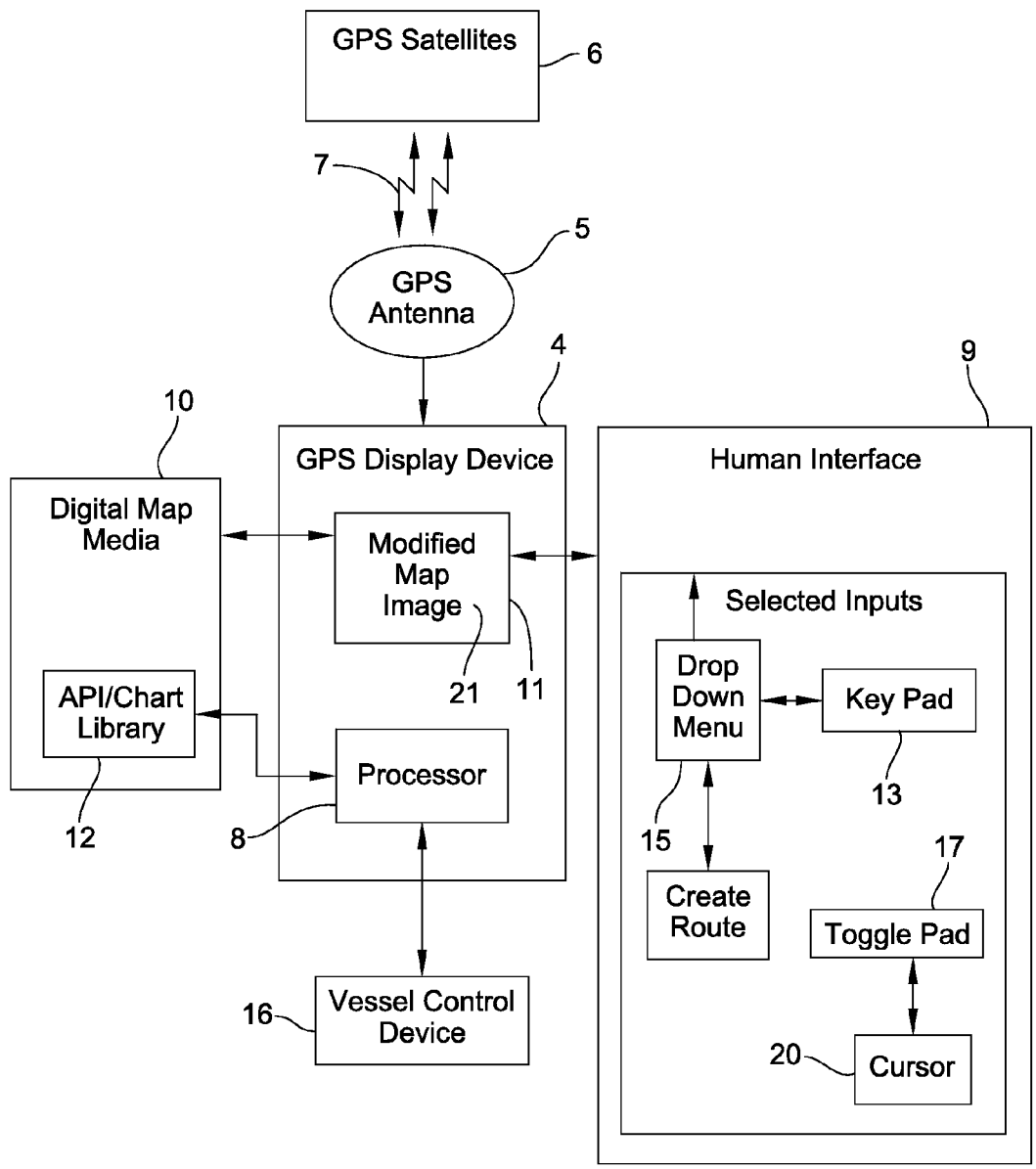
FIG. 2 is a simplified block diagram of a system according to an embodiment of the present invention.
Figure 3:
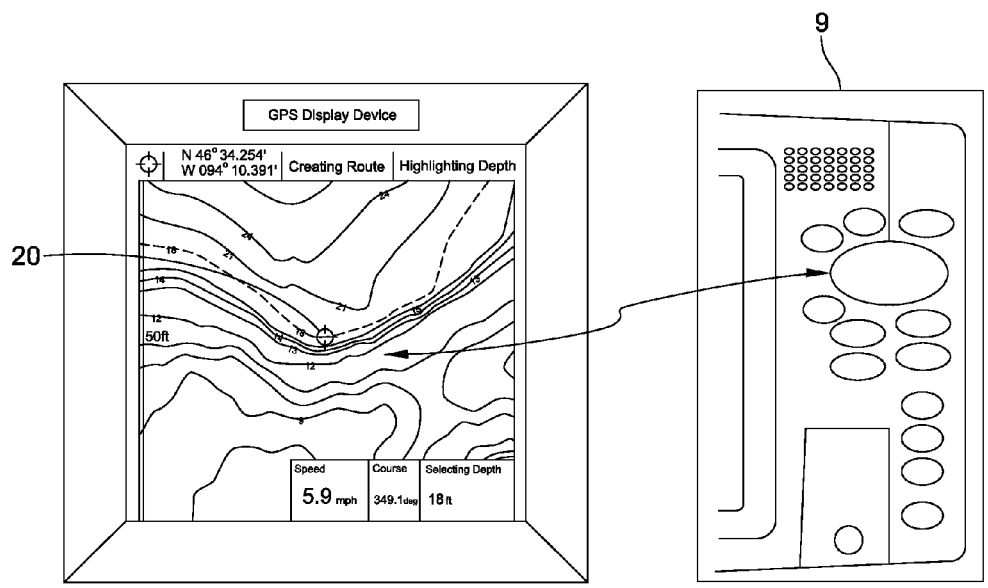
FIG. 3 is a simplified diagram illustrating a method for a toggle set cursor position to a select contour position according to an embodiment of the present invention.
Figure 4:
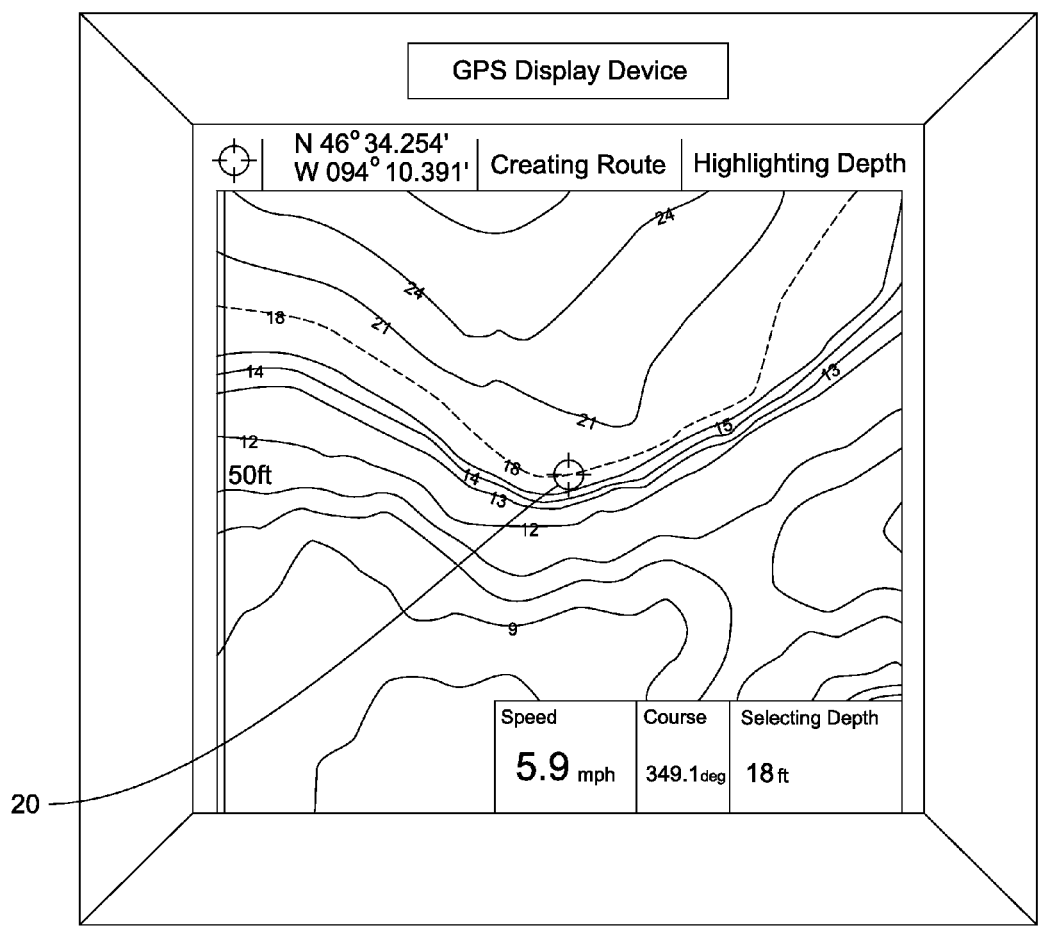
FIG. 4 is a simplified diagram illustrating a method for highlighting depth according to an embodiment of the present invention.
Figure 5:
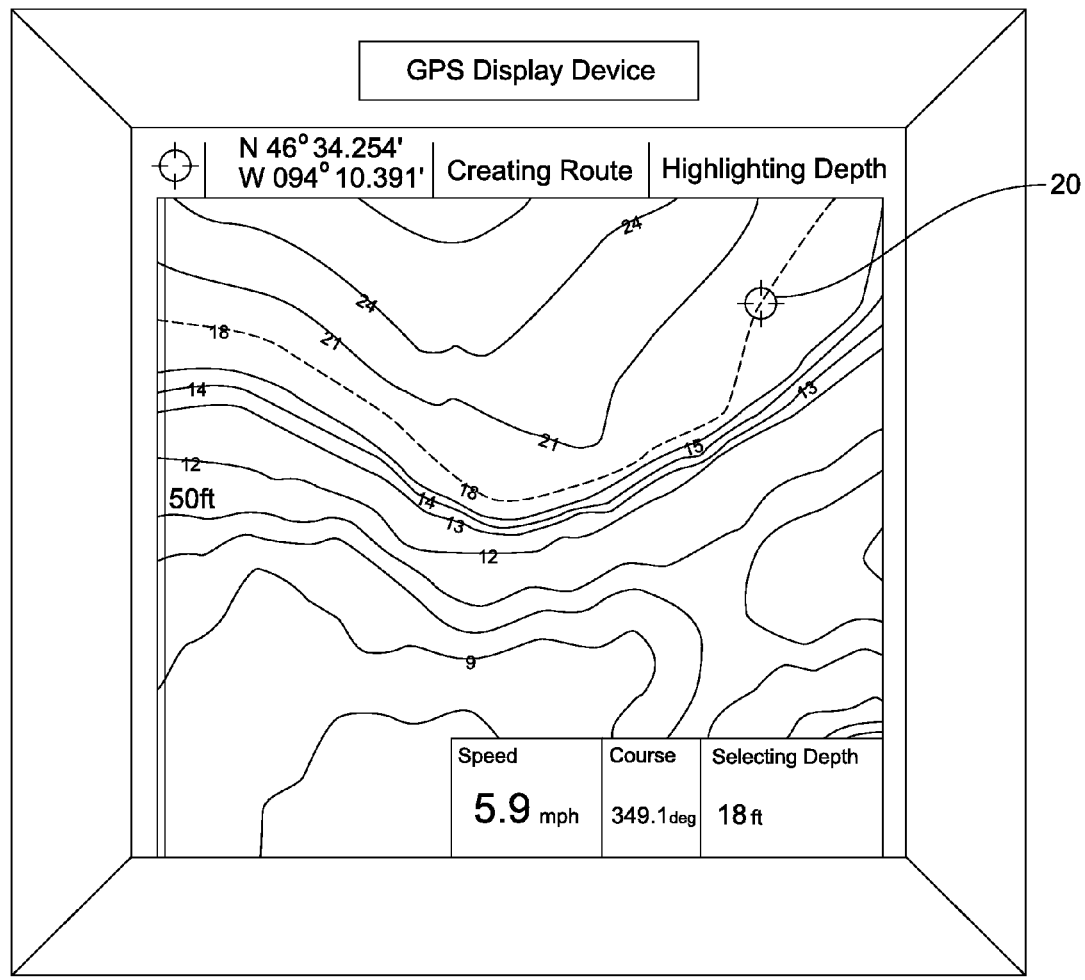
FIG. 5 is a simplified diagram illustrating a method to set a route starting point according to an embodiment of the present invention.
Figure 6:
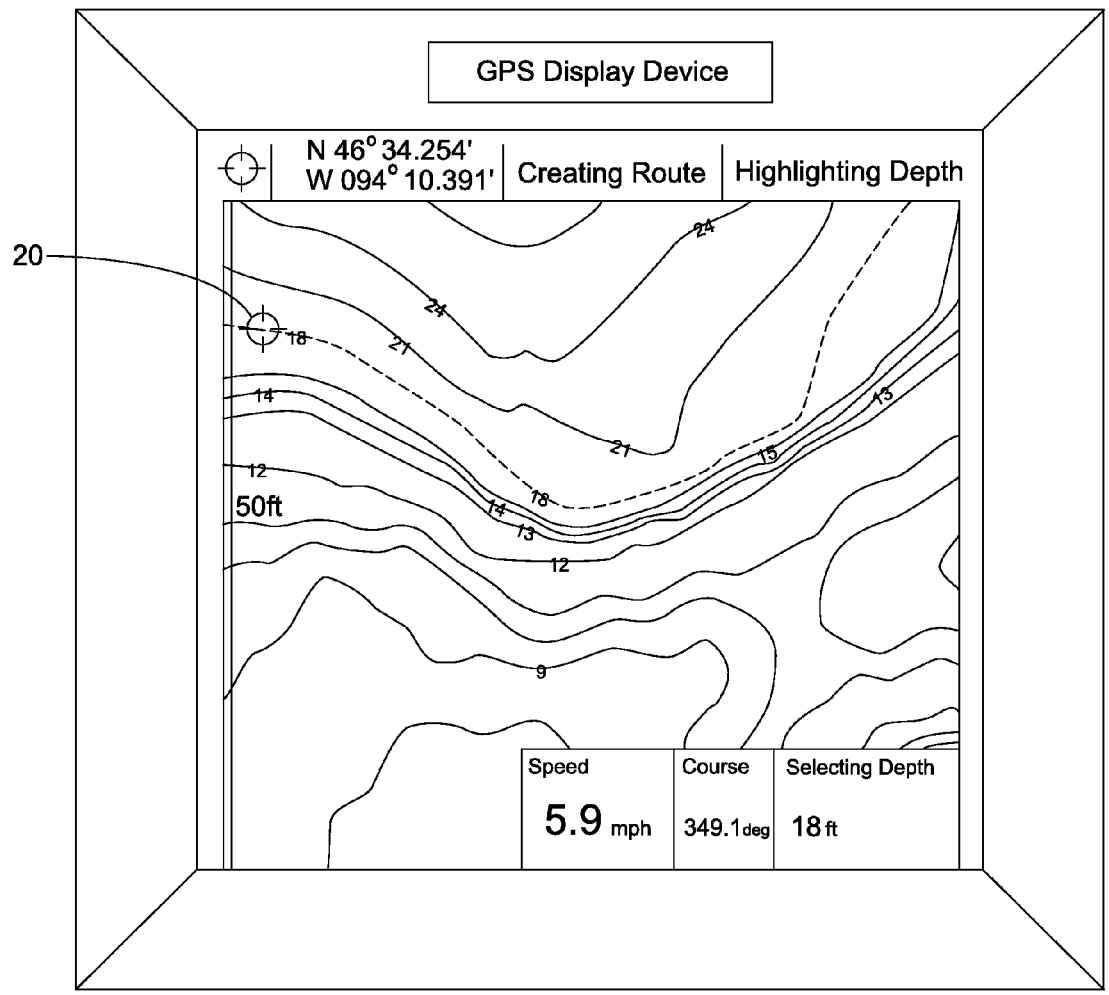
FIG. 6 is a simplified diagram illustrating a method to set a route ending point according to an embodiment of the present invention.
Figure 7:
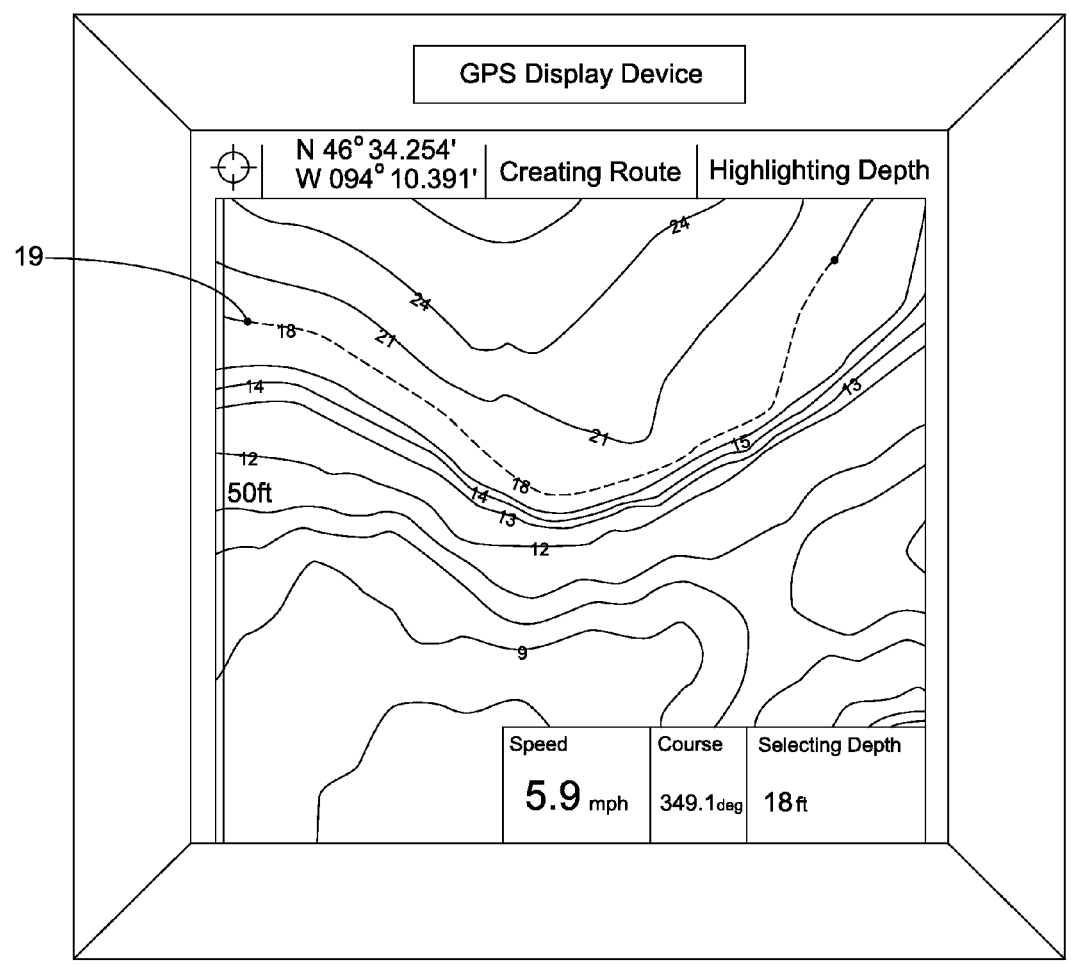
FIG. 7 is a simplified diagram illustrating a method for a route set, preparing machine instructions process according to an embodiment of the present invention.

Referring to FIGS. 1-7, a marine vessel or watercraft 1, is shown on the surface 2 of a body of water 3. The watercraft 1 has a GPS display 4 mounted thereon which is connected to a GPS antenna 5. In a specific embodiment, the GPS display 4 may be incorporated into a sonar depth finder/fish finder, such as shown in FIGS. 9 and 10, or, in alternate embodiments, the GPS display 4 may be a separate display unit. Also, the watercraft 1 could be any suitable marine vessel or the like, which can be provided on the surface 2 of the body of water 3. The body of water 3 can be from a river, lake, ocean, pond, or the like. Alternatively, the body of water 3 can be a bay, a stream, a canal, a reservoir, an impoundment, a slough, or some combination thereof. In a specific embodiment, the GPS display 4 can be a GPS chart plotter or separate Liquid Crystal Display Monitor. In a particular example, the GPS display 4 is a Humminbird Combo Unit as supplied by manufacturer Johnson Outdoors Marine Electronics, Inc. of 678 Humminbird Lane in Eufaula, Ala. 36027. There are other suitable examples of GPS displays 4.

A processor 8 repetitively processes the signals 7 from one or more GPS satellites 6 to determine the position of the watercraft 1. In a certain embodiment, the processor 8 uses this position information determines the correct visual map image to retrieve from the API/Chart Library 12 on the digital map media card 10 to display in the visual display area 11. That is, the processor 8 associates the position information, which has coordinates, and relates such information to a certain visual map image in digital form from a plurality of map images in at least one embodiment. As an example, the processor 8 may be a graphics controller or preprogrammed micro-processor, but is not limited to these exemplary devices. In a specific embodiment, the term "processor" is used broadly to include hardware, firmware, and software embodiments, among combinations, and the like.

In particular embodiments, the processor 8 is incorporated into the aforementioned sonar depth finder/fish finder. In an embodiment of the invention, the processor 8 then retrieves any user pre-sets inputted through a human interface 9 to modify the map image retrieved from the map media card 10 to create a modified map image 21 from the original map image. In particular embodiments, the human interface 9 is incorporated into the aforementioned sonar depth finder/fish finder. The processor 8 then places the modified map image 21 in the visual display area 11. The user then highlights a specific bottom contour 14 from which to create a route.

Referring to FIGS. 4-7 for the following example, the user employs the human user interface 9 to input a specific depth value, e.g., 18 feet, to the processor 8 using a specific input from the keypad 13 or toggle pad 17 to position the cursor 20 on the bottom contour 14 the user wishes the watercraft 1 to follow. In an embodiment, the user then uses the drop down menu 15 to indicate the processor 8 is to create a route. The processor 8 modifies the embedded codes in the visual image previously retrieved from the Chart Library 12. The modified code causes the processor 8 to then highlight the specified 18-foot depth contour line 14 by changing the graphic representation of the 18-foot contour line 14. The processor 8 then places the modified map image 21 showing the specific highlighted contour in the visual display area 11.

The user then determines whether to use the entire depth contour 14 or a part of the depth contour 14. To use only a part of the contour, the user uses the human interface 9 to move the cursor 20 over the starting point of the route to be created and uses the key pad 13 to "lock in" the start position. The user then moves the cursor 20 to the stop point of the route on the selected contour and uses the key pad to "lock in" the stop point of the route to be created. The processor 8 then retrieves the appropriate code from the designated section of the bottom contour 14 and converts it to a machine-readable set of instructions. These instructions are then retained by the processor 8 and made available to a vessel control device 16, which may include autopilot features. Of course the visual display area 11 can alternatively display the modified map image 21 for any location the user may choose. This allows the user to create specific routes in areas away from the vessel's current position. The user could also indicate the direction of travel. The system would then navigate the watercraft 1 along that depth contour line 14.

In an alternate embodiment, after the user inputs a specific depth value and a desired direction of travel through the user interface 9, the processor 8 would search the map information and, based on the current position of the watercraft 1, it would attempt to create a route in the approximate heading that will keep the watercraft 1 at or near the desired depth. Some bodies of water 3 have bottom areas that stay at a similar depth across a wide area perpendicular to the desired direction of travel. In particular embodiments, the processor 8 causes the vessel control device 16 to pick a route near the center of this wide tract of bottom area with a similar depth.

The processor 8 can be programmed to process the chart data in one of several different ways. In one instance, the depth information is formatted as a two-dimensional array of cells centered at a specific latitude and longitude. In this array of cells, there is a predetermined distance between each cell, for example in meters or some other linear unit of measurement. Each cell contains depth information which corresponds to the location at the center of that cell.

Using a depth chart in this fashion is similar to requesting a chart image to be drawn in an image buffer. The depth information is available for an entire region without having to request more data from the depth data provider. As an example, the coloring of a location over water on marine charts may be based on the water depth at that location. Therefore, returning an entire depth chart with three-dimensional data may not require much more processing power than rendering the two-dimensional chart.

In a second instance, in which the processor 8 does not have a large amount of memory to act as a depth information buffer, the processor 8 can determine the track it should follow by repeatedly requesting depth information at individual locations. For example, using the vessel's current position and its immediate heading, the processor 8 can search ahead of the current track to see when the contour line 14 it is following changes direction. When the contour line 14 changes direction, the processor 8 can determine how the vessel's course should be changed so that the contour line 14 is still followed, and send the appropriate commands to the vessel control device 16.

While making a sequence of direct function calls in this manner might use more processor power than the depth chart method, it does not require the considerable storage capacity needed for a depth chart. In this scenario, the processor 8 essentially feels its way around the contour line 14 via repeated depth inquiries without having to compute and store a lot of depth values that will not be used.

An alternate embodiment includes a method in which the user indicates a certain depth contour line 14 on the map being displayed on the GPS display 4. The user could also indicate the direction of travel. The user would also input a value of depth which will be used as a depth offset from the selected depth contour line 14. The system would create a route that follows the desired depth (contour line+/−depth offset) and attempts to stay parallel to the selected contour line.

Another embodiment includes a method in which the user indicates two adjacent depth contour lines 14 on the map being displayed on the GPS display 4. The user could also indicate a desired direction of travel. The system would navigate the watercraft 1 along a course that lies between these two depth contour lines 14. The system could navigate a course close to the center point between these two contour lines 14, or could navigate a course designated by the user anywhere between the selected depth contour lines 14.

Yet another embodiment includes a method in which the user indicates a certain depth contour line 14 on the map being displayed on the GPS display 4. The user could also indicate the direction of travel. In this embodiment, the user would also input a value of lateral shift the course should have from the selected contour line 14. This would be especially helpful for users that want to follow the shoreline, for example, but at a predetermined distance. FIG. 8 illustrates how such a lateral shift would work. In this situation, the user would indicate to which side of the contour line 14 they want to navigate and how far away from the original track 30 the laterally-shifted track 32 is to be. In FIG. 8 the laterally-shifted track 32 is offset 10 feet from original track 30, however, the offset selected by the user could be greater or lesser than 10 feet. In a particular embodiment, the fish finder software would create the new set of track points that make up the laterally-shifted track 32 from the continuous tangencies of the original track 30.

Another method would involve the user simply marking two points on the map that have the same or similar depth. In a particular embodiment, the fish finder software in conjunction with the 3D cartography creates a track that goes between these two markers that also follows the desired depth. The fish finder is also able to extend the track beyond the two markers while still following the desired depth. This track data can then be used by the vessel control device 16, for example with a trolling motor for navigation. In some cases, the fish finder software would employ an algorithm to create a best fit line for situations where the bottom contour is flat.

Still another embodiment includes a method in which the user identifies segments of displayed depth contour lines 14 that aren't necessarily indicating the same depth. The system would allow the user a way to dictate how these selected segments would get strung together. This method would also include a way for the user add in any track points between track segments that are needed or desired to show the desired route to travel between these segments of depth contour lines 14.

In a specific embodiment, the present invention provides a method for selecting lake bottom contour line(s) for a body of water from a digital or raster map of lake bottom contours displayed on a GPS display 4 or other display device and converting them to a machine-readable code to allow the vessel control device 16 to navigate the watercraft 1 along the selected contour(s). In certain embodiments, the vessel control device 16 is a trolling motor control device having autopilot capabilities.

An example of specific sequence of steps carried out via programmed vessel control device 16 and GPS display 4 is shown below in a step by step sequence, in accordance with an embodiment of the invention.

1. Provide a plurality of charts or maps from a Chart Library 12 (e.g., stored on a thumb drive, CD, memory card, flash memory, memory stick, hard memory, fixed memory, database);

2. Provide at least one chart out (e.g., vector and/or raster) of the plurality of charts with depth contour lines 14 for one or more regions of a body of water 3;

3. Display the chart on a display or GPS display 4 based on the vessel's current position or by selecting a different part of the chart away from the vessel, while navigating a vessel which is coupled to the display or GPS display 4;

4. User selects at least one depth contour line 14 to be highlighted within the chart on the display;

5. Processor 8 evaluates the information associated with the selected depth contour line 14 using specific attributes embedded within the chart display to create a course along which the vessel is to be navigated;

6. User may optionally select a starting point and an ending point on a particular depth contour line 14 if only a portion of the course created is to be employed;

7. Processor 8 converts the route generated machine-readable code within the GPS or other device;

8. Processor 8 outputs one or more indications associated with the one or more depth contour lines 14 on the display;

9. Transfer the machine-readable code to a vessel control device 16, coupled to a navigation system, which may also include a trolling motor, including rudder;

10. Engage the vessel control device to automatically navigate the vessel along the selected contour line using the course instruction code(s).

As shown, the present method includes a sequence of steps and/or processes that, among other things, allow for automated vessel navigation by way of selecting at least a portion of a depth contour line 14 on a map or chart. Depending upon the embodiments, the steps shown above may be combined or separated. Additional steps may be added or certain optional steps may be removed. Alternate methods according to embodiments of the present invention are described below.

For example, an alternate method for navigating a watercraft 1 along a depth contour 14, according to an embodiment of the invention, may be identified as follows.

1. Provide at least one chart (e.g., vector and/or raster) out of the plurality of charts for one or more regions of a body of water 3 containing intelligent pixels containing attributes discernible by raster intercept;

2. While navigating a vessel which is coupled to a display or GPS display 4, user selects current position or selects cursor position to display a different part of the chart away from the vessel position;

3. If cursor position equals current vessel position, display raster image of current position associated with the zoom level and detail resident on the display or GPS display 4, if not then display raster image at cursor coordinate location associated with the zoom level and detail resident on the display or GPS display 4;

4. User inputs desired depth contour along which to create route, (e.g. depth, bottom content, weed edge)

5. User selects depth from drop down menu or keypad;

6. Processor 8 evaluates intelligent pixels in current display and adds appropriate pixels to highlight memory buffer;

7. When all pixels in current display are evaluated, set color attribute of pixels in highlight memory buffer to "highlight color" and output highlight memory buffer to Display or GPS display;

8. User sets cursor 20 at starting point on highlighted contour;

9. Processor 8 evaluates all pixels in highlight memory buffer to find pixel with location attribute equal to cursor location and place start pixel in course memory buffer;

10. User sets cursor 20 at ending point on highlighted depth contour 14;

11. Processor 8 evaluates all pixels in highlight contour memory buffer to find pixel with location attribute equal to cursor location and place ending point pixel in course memory buffer;

12. Processor 8 evaluates starting and ending pixel to establish horizontal spatial bounds of course along highlighted depth contour 14;

13. Processor 8 evaluates pixels in highlight contour memory buffer and places all pixels within horizontal course spatial boundaries in the course memory buffer;

14. Processor 8 evaluates all pixels in the course memory buffer to place them in spatially ordered sequence from start pixel to end pixel;

15. Processor 8 evaluates the azimuth between each pixel sequentially in course memory buffer to determine if azimuth changes between successive pixels;

16. For each azimuth between pixels that represents a change from the previous azimuth between pixels, place the current pixel and the pixel immediately preceding the azimuth change in the vessel control buffer;

17. When processor 8 has evaluated all azimuths between pixels in the course memory buffer, lookup vessel control device instruction format;

18. Choose correct world coordinate file and for each intelligent pixel in the course buffer, convert each intelligent pixel's location attribute to the correct world file coordinate;

19. Engage the vessel control device 16 to navigate the watercraft 1 along the selected contour line 14 using the converted world coordinate file; and In embodiments of the invention, the API is provided with the ability to convert contour line information into machine-readable code for autopilot-enabled devices that may be used on fishing and boating vessels, for example. This functionality is provided to the API and is thus applicable to devices that can access the API. The mapping display function of the API is more particularly described below.

The function and graphic primitives that allow this function to be performed on a GPS display 4 are resident in one or more codes. Typically, the GPS manufacturer (in this case, as an example, Humminbird) provides the Operating System Menu Options that allow this function to be invoked through a drop down menu 15, thus allowing the user to select all or part of a particular bottom contour line 14 or combination of different contour lines 14 for conversion to machine-readable codes accessible by the vessel control device 16 with autopilot features. The selection is accomplished, for example, by inputting a desired depth through a screen slide bar, keypad 13, toggle switch 17, or like data entry method.

When a specific depth contour line 14 is selected and highlighted, the API extracts an attributed image of the selected contour line 14 from the map contained in a Chart Library 12, which contains various bottom contour maps for different bodies of water. In a specific embodiment, the chart comprises at least information selected from a hardness of the bottom of the body of water 3, a content of the bottom of the body of water 3, a weed content of the body of water 3, or a flow current for the body of water 3. The depth contour line 14 is a series of GPS or spatial coordinates that represent a specific depth. The API then uses the attributed image to create a series of machine-readable coordinates, for example GPS coordinates, which can be accessed and utilized by the vessel control device 16. Any depth contour line displayed by the GPS display 4 can be selected for conversion to machine-readable coordinates by the API.

In a specific embodiment, the chart being displayed includes at least one indication. Specifically, one or more indications are associated with one or more broken contour lines, one or more flashing depth contour lines 14, one or more series of symbols, or other visual indications for a display. In a specific embodiment, the one or more indications are associated with one or more contour lines 14 differentiated from the remaining depth contour lines 14 or wherein the one or more indications are associated with one or more shaded regions differentiated from the remaining regions, or wherein the one or more indications are associated with one or more colored regions differentiated from the remaining regions.

In a specific embodiment, the present system and method allow for the creation and export of tracking routes from a complex intelligent image or vector database formed from a variety of inputs. Further details of aspects of the invention are provided throughout the present specification and more particularly below.

In a specific embodiment, a tracking route 19 (see FIG. 7) is a sequenced set of coordinates suitably spaced with a starting and end point and in the proper format and geographic projection for directional use with an intelligent electronic trolling motor or other vessel control device. The system and method generate these routes 19 by tracking edges from the intelligent image or from line segments of the vector database.

In a specific embodiment, an edge is a linear sequence of image points of constant value and along which the values on opposite sides of the line are different. For example, in a simple lake contour map the contour lines 14 represent edges along which the lake depth is constant and changes from one side of the contour line to the other. The images from which these edges are derived may be simple depth images or complex images derived from a variety of sources.

In a specific embodiment, a line segment of the vector database consists of points of constant value and along which the values on opposite sides of the line segment are different. For example, in a simple lake contour map the depth contour lines 14 represent line segments along which the lake depth is constant and changes from one side of the contour to the other. The vector database from which these line segments are derived may be simple depth points or complex lines derived from a variety of sources, which are examples. Such sources include:

1. Intelligent-image-based depth contour maps in which depth information is encoded directly into the image;
2. Auto-correcting vector-based contours in which the depth information is encoded into sequenced points which are automatically corrected for changes in lake levels based on user-selected offset values;
3. Water clarity and substrate data for a body of water representing the type of bottom surface (rock, sand, mud) and the presence of vegetation;
4. Date, time, and user-provided weather data (wind speed and cloud cover).

In at least one embodiment, these images or vector line segments are generated based on combinations of the above data from user input and may simply represent depth or combined data such as depth and light intensity or depth and vegetation. In this embodiment, the user may then select a start and end point for the route generation and the system tracks the desired edge and displays the track on the screen for user verification. The user can then direct the system to transfer the tracking route 19 to the vessel control device 16 by converting the image or line segment coordinates to the world coordinates and format required by the vessel control device 16.

FIG. 9 shows a diagram of the watercraft 1 with a bow-mounted electric trolling motor 34. In this embodiment, the trolling motor 34 is connected to a vessel control device 16 in the form of a trolling motor controller 36. The trolling motor controller 36 includes the following: GPS receiver, electric steering motor for rotating the trolling motor, compass that is mounted such that its feedback corresponds to the direction the motor is pointing, RF section used to communicate with a wireless remote control 40, and an additional communications section used for communication with a sonar depth finder/fish finder 38 (could be RF or hard-wired such as Ethernet).

The sonar depth finder/fish finder 38, which in this embodiment is mounted to the operator's console 39, includes a GPS receiver the GPS display 4, and may include memory for storage of charts and maps with depth contour lines 14. Further, the sonar depth finder/fish finder 38 may be configured to carry out the methods of providing charts for a body of water with depth contour lines 14, allowing the user to select a particular depth contour line 14, or some portion thereof, for the watercraft 1 to follow, and generating one or more routes for the watercraft 1 based on user input.

In certain embodiments, the fish finder 38 may not have enough memory to store a large number of charts for various bodies of water, but instead includes connections for portable memory devices (e.g., USB thumb drives, memory cards, optical drives) which can store maps with depth contour lines 14. In some embodiments, the fish finder 38 has a cursor feature to enable the user to move the cursor 20 to allow for selecting the depth contour line 14 to be followed.

In certain embodiments of the invention, the wireless remote control 40 has a user interface that includes a display screen, a keypad, and some combination of buttons or function keys. As such, elements of the human interface 9 described above may be incorporated into the wireless remote control 40. The display screen on the remote control 40 could be an LCD display, LED display, or some other suitable type of display. It is also envisioned that the display screen could be a touch-screen configured to accept input commands from the user. Such a touch screen display could allow for the elimination of function keys or buttons on the keypad. In a particular embodiment, the wireless remote control 40 is the primary user interface for controlling the trolling motor 34, whether directly controlling the trolling motor's functions or using one or a combination of built-in functions to implement automated control of the trolling motor 34. In this case, direct control means that the user could control the speed and heading of the watercraft 1 via real-time control of the trolling motor 34 through the wireless remote control 40.

In a particular embodiment, the wireless remote control 40 may be configured to display a smaller version of the GPS display 4. As such, the user wouldn't necessarily have to be in front of the GPS display 4 to identify depth contours or track points that are stored and displayed on the GPS display 4. This would give the user similar functionality as through the fish finder 38 for doing things like identifying depth contour lines 14 and track points to navigate along.

FIG. 10 shows a diagram of the watercraft 1 with a transom-mounted main propulsion system and transom-mounted trolling motor 44 connected to the trolling motor controller 36. As in the embodiment of FIG. 9, the sonar depth finder/fish finder 38 includes maps with depth contour lines 14 and the GPS display 4. Also, as in the embodiment of FIG. 9, the fish finder 38 includes a cursor feature to enable the user to move the cursor 20 to allow for selecting the depth contour line 14 to be followed. Further, the trolling motor controller 36 includes control mechanisms in which the rudder can be automatically steered, and a compass which, in particular embodiments, is mounted to the watercraft 1 and calibrated so that the keel line of the watercraft 1 is known to the trolling motor controller 36. This control mechanism can then receive target headings from the fish finder 38 and be able to keep the watercraft 1 on the desired course until a new heading is received.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling a marine vessel, the system comprising:
   a sonar depth finder configured to display a chart for a body of water, the chart including depth information for the body of water, wherein the sonar depth finder is programmed to allow a user to select from a plurality of depths indicated on the sonar depth finder display, the sonar depth finder further configured to generate a route for the marine vessel wherein the route includes a path through the body of water such that at each point along the path, the water is at the desired depth; and
   a vessel control device in communication with the sonar depth finder, the vessel control device configured to receive transmissions from the sonar depth finder, the transmissions including the route generated by the sonar depth finder, the vessel control device being further configured to automatically direct the marine vessel along the route.

2. The system of claim 1, wherein the depth information includes one or more depth contour lines superimposed on the display of the chart for the body of water, wherein each depth contour line represents a particular depth in the body of water.

3. The system of claim 2, wherein the sonar depth finder includes a GPS receiver with GPS display, and is configured to permit a user to select from the one or more of the depth contour lines from which selection the sonar depth finder generates the route for transmission to the vessel control device.

4. The system of claim 2, wherein the sonar depth finder is configured to permit a user to select portions from the one or more depth contour lines from which selection the sonar depth finder generates the route for transmission to the vessel control device.

5. The system of claim 4, wherein the sonar depth finder is configured to permit the user to add track points between selected portions from the one or more depth contour lines from which the sonar depth finder generates the route for transmission to the vessel control device, the route including both the selected portions and added track points.

6. The system of claim 2, wherein the sonar depth finder is configured to permit a user to select a depth contour line and a direction of travel from which selection the sonar depth finder generates the route for transmission to the vessel control device.

7. The system of claim 6, wherein the sonar depth finder is configured to permit the user to select an offset to the depth contour line and a direction of travel, and to generate a route, based on the chosen offset, for transmission to the vessel control device.

8. The system of claim 1, wherein the vessel control device comprises a controller for a trolling motor, the controller comprising a GPS receiver, a compass, a wireless communications module, and means for rotating the trolling motor.

9. The system of claim 8, further comprising a remote control device for the controller, wherein remote control device is configured to allow a user to remotely operate the trolling motor, and wherein the remote control device includes a display configured to display a chart for a body of water.

10. The system of claim 8, wherein the controller is configured to store date for the entire route generated by the sonar depth finder and to control the trolling motor such that the marine vessel automatically follows the route.

11. The system of claim 8, wherein the controller is configured to store date for only a portion of the route, and wherein the controller is configured to periodically receive data from the sonar depth finder regarding the portion of the route the marine vessel is about to navigate.

12. The system of claim 1, wherein the depth information includes one or more colors superimposed on the display of the chart for the body of water, wherein each color represents a particular depth in the body of water.

13. A system for controlling a marine vessel, the system comprising:
    a sonar depth finder configured to display a chart for a body of water, the chart including depth information for the body of water, wherein the sonar depth finder is programmed to allow a user to input a desired depth, the sonar depth finder further configured to generate one or more routes for the marine vessel wherein the route includes a path through the body of water such that at each point along the path, the water is at the desired depth; and
    a vessel control device in communication with the sonar depth finder, the vessel control device configured to receive transmissions from the sonar depth finder, the transmissions including the route generated by the sonar depth finder, the vessel control device being further configured to automatically direct the marine vessel along the route.

14. The system of claim 13, wherein the vessel control device comprises a controller for a trolling motor, the controller comprising a GPS receiver, a compass, and means for rotating the trolling motor.

15. The system of claim 14, further comprising a remote control device for the controller, wherein remote control device is configured to allow a user to remotely operate the trolling motor, and wherein the remote control device includes a display configured to display a chart for a body of water.

16. The system of claim 14, wherein the controller is configured to store date for the entire route generated by the sonar depth finder and to control the trolling motor such that the marine vessel automatically follows the route.

17. The system of claim 14, wherein the controller is configured to store date for only a portion of the route, and wherein the controller is configured to periodically receive data from the sonar depth finder regarding the portion of the route the marine vessel is about to navigate.

18. The system of claim 13, wherein the vessel control device is in wireless communication with the sonar depth finder.

19. The system of claim 13, wherein the sonar depth finder includes a GPS receiver and GPS display.

* * * * *